United States Patent
Mizuno et al.

(10) Patent No.: US 7,539,703 B2
(45) Date of Patent: May 26, 2009

(54) SETUP METHOD FOR DISASTER RECOVERY SYSTEM

(75) Inventors: Kazuhiko Mizuno, Sagamihara (JP); Shinji Fujiwara, Sagamihara (JP); Yoshio Suzuki, Kokubunji (JP)

(73) Assignee: Hitachi, Ltd., Tokyo (JP)

(*) Notice: Subject to any disclaimer, the term of this patent is extended or adjusted under 35 U.S.C. 154(b) by 203 days.

(21) Appl. No.: 11/455,751

(22) Filed: Jun. 20, 2006

(65) Prior Publication Data

US 2007/0271313 A1 Nov. 22, 2007

(30) Foreign Application Priority Data

May 19, 2006 (JP) ............... 2006-139966

(51) Int. Cl.
*G06F 17/30* (2006.01)
(52) U.S. Cl. .............. 707/202; 714/2; 714/15
(58) Field of Classification Search ............. 707/202; 714/2, 15
See application file for complete search history.

(56) References Cited

U.S. PATENT DOCUMENTS

| | | | |
|---|---|---|---|
| 5,594,900 A * | 1/1997 | Cohn et al. | 707/202 |
| 5,640,561 A * | 6/1997 | Satoh et al. | 707/202 |
| 6,065,018 A * | 5/2000 | Beier et al. | 707/202 |
| 6,226,651 B1 * | 5/2001 | Masuda et al. | 707/202 |
| 6,408,370 B2 | 6/2002 | Yamamoto et al. | |
| 6,785,791 B2 | 8/2004 | Watanabe et al. | |
| 6,988,176 B2 | 1/2006 | Suzuki et al. | |
| 2004/0025076 A1 * | 2/2004 | Cabrera et al. | 714/2 |
| 2004/0098425 A1 * | 5/2004 | Wiss et al. | 707/204 |
| 2004/0139124 A1 * | 7/2004 | Kawamura et al. | 707/202 |
| 2004/0139128 A1 * | 7/2004 | Becker et al. | 707/204 |
| 2004/0193658 A1 * | 9/2004 | Kawamura et al. | 707/202 |
| 2005/0172166 A1 * | 8/2005 | Eguchi et al. | 714/20 |
| 2005/0283504 A1 * | 12/2005 | Suzuki et al. | 707/202 |

FOREIGN PATENT DOCUMENTS

| | | |
|---|---|---|
| JP | 11-085408 | 3/1999 |
| JP | 2002-297455 | 10/2002 |
| JP | 2006-004147 | 1/2006 |

* cited by examiner

*Primary Examiner*—Shahid A Alam
*Assistant Examiner*—Phong Nguyen
(74) *Attorney, Agent, or Firm*—Brundidge & Stanger, P.C.

(57) ABSTRACT

Provided is a technique of setting up a disaster recovery system. In a log-based disaster recovery system including a first site for processing data and a second site for storing a backup of the first site, the first site has a volume where data is stored and a volume that is made quiescent. The disaster recovery system accepts data updates while sequentially copying initial data from the quiescent volume to the second site. A copy of a log of the first site is kept in the second site and is synchronized with the original log. When data of the first site is updated and corresponding initial data has not been copied to the second site, the data to be updated is preferentially copied to the second site. A log is applied to the copied data, thereby matching data of the second site with data of the first site.

7 Claims, 11 Drawing Sheets

US 7,539,703 B2

SETUP METHOD FOR DISASTER RECOVERY SYSTEM

CLAIM OF PRIORITY

The present application claims priority from Japanese patent application P2006-139966 filed on May 19, 2006, the content of which is hereby incorporated by reference into this application.

BACKGROUND OF THE INVENTION

This invention relates to a technique of setting up a disaster recovery system through cooperation between a database server and a storage system.

In recent years, information systems have become the foundation of many businesses, and their importance is ever increasing. This expands the impact of system shutdown due to a disaster or the like to a significant degree. In banking business, for example, the system shutdown could cause a loss of nearly several million dollars an hour. It is against this background that disaster recovery (DR) is attracting attention, which makes an information system quickly recover from a disaster for continuation of the service by keeping a backup on a remote site.

Service application data is stored in a database (DB), and it is imperative to restore the whole DB from a disaster without losing any piece of the data. Also, on a day-to-day basis, the data backup has to be carried out continuously while affecting the service as little as possible. Furthermore, the thus obtained backup has to be stored on a remote site that is located several hundreds to several thousands km away in anticipation of an earthquake or other disasters that affect a wide area.

As disclosed in JP 2006-4147 A, "log application" is a known disaster recovery technology in which data update history information (including a log) of the primary site is copied to the remote site (hereinafter, referred to as "remote copy") and the duplicated log is applied to restore data of the primary site on the remote site.

A DR system utilizing log application (hereinafter, referred to as "log-based DR system") makes sure that, when the log of the primary site is updated, the updated log is copied to the remote site before proceeding with processing of the primary site (hereinafter, referred to as "synchronous copy"). In addition, JP 11-85408 A discloses a remote copy technology that copies data between separate storage controllers without an intervening database server.

The log-based DR system copies, to the remote site, in advance, data that is stored on the primary site as initial settings (hereinafter, referred to as "initial copy") and, after the initial copy is finished, copies only the log through synchronous copy. The DB is restored by applying a log that is copied through synchronous copy after the initial copy, and data of the primary site is thus replicated on the remote site. Initial copy is carried out by means of a recording medium or a remote copy function of a storage system. In an example of the initial copy method that utilizes the remote copy function as disclosed in JP 2002-297455 A, data stored in an area to be updated is transferred to a copy destination storage system when a copy source storage system is updated.

According to this method, a primary site storage system from which data is copied has to be quiescent while the initial copy is being executed. In a storage system that is in a quiescent state, updating data stored in the storage system is prohibited. Online processing therefore has to be put off until the initial copy is completed. When the size of data to be copied in the initial copy is large, it takes considerable time to finish the initial copy and the start of online processing on the primary site is delayed.

A DR system may have a local mirror on the primary site, so that one storage system is used for online processing and the other serves as a copy source storage system in initial copy. Duplicating a DB in this manner makes it possible to execute online processing of the primary site in parallel with initial copy processing.

However, the start of log application on the remote site is delayed significantly when the initial copy takes very long. A substantial delay in start of log application in a log-based DR system, which employs ring buffer logging, causes a problem called wrap round in which the log of the remote site is overwritten by online processing of the primary site. Applying the remote site log in this state creates data inconsistency.

SUMMARY OF THE INVENTION

This invention has been made in view of those problems, and it is therefore an object of this invention to provide a technique of setting up a DR system while accepting online processing of a primary site and avoiding log wrap round.

According to a representative aspect of this invention, a disaster recovery system is characterized in that the disaster recovery system includes: a first site; and a second site coupled to the first site via a network, for storing a copy of data stored in the first site. The first site comprising: a first computer having a database management system, for executing a reference processing and an update processing according to a request sent from a client computer; and a first storage system for storing data accessed by the first computer. The second site comprising: a second computer; and a second storage system for storing a copy of data stored on the first site. The first computer comprising: a first communication interface for coupling to the network; a first input/output interface for coupling to the first storage system; a first processor coupled to the first input/output interface; and a first memory coupled to the first processor. The first storage system comprising: a second input/output interface for coupling to the first computer and to the second storage system; a second processor coupled to the second input/output interface; a second memory coupled to the second processor; and a first disk drive for storing data accessed by the first computer. The second computer comprising: a second communication interface for coupling to the network; a third input/output interface for coupling to the second storage system; a third processor coupled to the third input/output interface; and a third memory coupled to the third processor. The second storage system comprising: a fourth input/output interface for coupling to the first storage system and to the second computer; a fourth processor coupled to the fourth input/output interface; a fourth memory coupled to the fourth processor; and a second disk drive for storing the copy of the data stored in the first storage system. The first disk drive including: a first volume for storing data accessed by the first computer, a second volume which is a duplicate of the first volume and which is split from the first volume; and a third volume for storing a log of the reference processing and a log of the update processing The second disk drive including: a fourth volume which is a duplicate of the first volume; and a fifth volume which is a duplicate of the third volume. The first storage system storing a first data area copy state management information including a copy state of data stored in the second volume. The second computer comprising a log applying module which applies a log stored in the fifth volume to the fourth volume to restore data. The second storage system storing a second data area copy state management information including a copy state of data stored in the fourth volume. Data stored in the second volume is sequentially copied to the fourth volume. The first computer creates a log and sends the created log and the updated data to the first storage system upon receiving an update request sent from the client computer. The first storage system refers to the first data area copy state management information to judge whether or not data stored in the second volume that corresponds to to-be-updated data stored in the first volume has been copied to the fourth volume. The first storage system preferentially copies the data stored in the second volume to the fourth volume when the data stored in the second volume has not been copied. The first storage system stores the created log in the third volume and sends the created log to the second storage system. The second storage system stores the received log in the fifth volume and notifies the second computer of the storing. The second computer instructs the second storage system to obtain data to which the log is to cause the log applying module to apply the received log to data stored in the fourth volume. The second storage system refers to the second data area copy state management information to judge whether the data to which the log is to be applied has been copied or not. The second storage system stands by until copying of the data is completed when the data to which the log is to be applied has not been copied. The second storage system sends, to the second computer, the data to which the log is to be applied, and applies, by the log applying module, the created log to the received data to which the created log is to be applied, and stores the updated data in the fourth volume.

According to the embodiment of this invention, initial copy can be executed without stopping online processing of a primary site as a first site.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Embodiments of this invention will be described below with reference to the accompanying drawings.

First Embodiment

Figure 1:
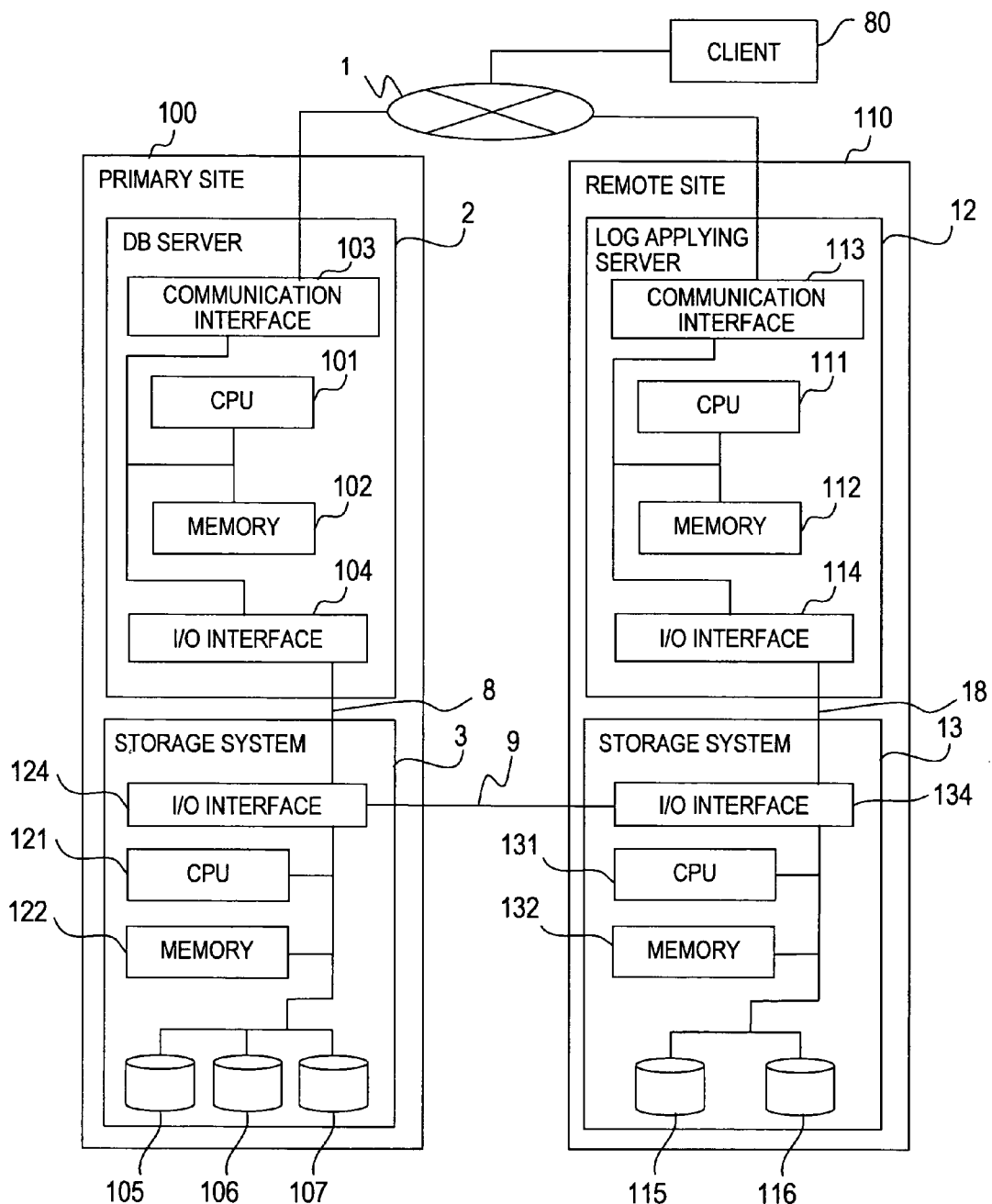
FIG. 1 is a hardware configuration diagram of a log-based DR system according to a first embodiment.

FIG. 1 is a hardware configuration diagram of a log-based DR system according to a first embodiment. The log-based DR system of the first embodiment is composed of a primary site 100 and a remote site 110. The primary site 100 and the remote site 110 are connected to each other via a network 1. The network 1 is, for example, an IP network. Also connected to the network 1 is a client computer 80 for sending a data processing request.

The primary site 100 receives a processing request from the client computer 80 and executes online processing. The primary site 100 contains a database server (DB server) 2 and a storage system 3. The DB server 2 and the storage system 3 are connected to each other by a server-to-storage interface 8. The server-to-storage interface 8 is, for example, a Fibre Channel, and is connected to a storage area network (SAN).

The DB server 2 processes, upon reception of a processing request from the client computer 80, data stored in the storage system 3. The DB server 2 has a CPU 101, a memory 102, a communication interface 103 and an I/O interface 104.

The CPU 101 executes programs stored in the memory 102 to execute various types of processing. The memory 102 stores programs executed by the CPU 101 and data that is necessary to processing. The communication interface 103 is connected to the network 1 and receives a processing request from the client computer 80. The I/O interface 104 is connected to the storage system 3 via the server-to-storage interface 8.

The storage system 3 stores data processed by the DB server 2 and a log. The log is the history of updates made by the DB server 2, and the DB can be reconstructed by applying a log to pre-update data. The log here is, for example, the log of transactions executed by the DB server 2 or the whole SQL commands related to a service that are received by the DB server 2.

The storage system 3 has a CPU 121, a memory 122, disk drives 105 to 107 and an I/O interface 124.

The CPU 121 executes programs stored in the memory 122 to execute various types of processing. The memory 122 stores programs executed by the CPU 121 and data that is necessary to processing. The disk drives 105 to 107 store data processed by the DB server 2 and the log.

The I/O interface 124 is connected to the DB server 2 via the server-to-storage interface 8. The I/O interface 124 is also connected to a storage system 13 of the remote site 110 which will be described later. The storage system 3 is connected to the storage system 13 by a storage system-to-storage system interface 9. The storage system-to-storage system interface 9 is, for example, a Fibre Channel and is connected to a SAN.

The remote site 110 creates and stores a copy of service application data stored on the primary site 100. The remote site 110 contains a simple server 12 and the storage system 13. The simple server 12 and the storage system 13 are connected to each other by a server-to-storage interface 18. The server-to-storage interface 18 is, for example, a Fibre Channel and is connected to a SAN.

The simple server 12 creates a copy of service application data stored on the primary site 100. The simple server 12 has a function of restoring data by applying a log to data that is copied in initial copy. Alternatively, the simple server 12 may be a database server to take over the processing of the DB server 2. The simple server 12 has a CPU 111, a memory 112, a communication interface 113 and an I/O interface 114.

The CPU 111 executes programs stored in the memory 112 to execute various types of processing. The memory 112 stores programs executed by the CPU 111 and data that is necessary to processing. The communication interface 113 is connected to the network 1 and receives a recovery request when a failure occurs in the system. The I/O interface 114 is connected to the storage system 13 via the server-to-storage interface 18.

The storage system 13 stores a copy of data that is stored on the primary site 100 and a copy of the log of the primary site 100. The storage system 13 has a CPU 131, a memory 132, an I/O interface 134 and disk drives 115 and 116.

The CPU 131 executes programs stored in the memory 132 to execute various types of processing. The memory 132 stores programs executed by the CPU 131 and data that is necessary to processing. The I/O interface 134 is connected to the simple server 12 via the server-to-storage interface 18. The I/O interface 134 is also connected to the storage system 3 of the primary site 100 via the storage system-to-storage system interface 9 as mentioned above. The disk drives 115 and 116 store a copy of data stored on the primary site 100 and a copy of the log of the primary site 100.

Data can be copied directly between the storage system 3 and the storage system 13 via the storage system-to-storage system interface 9 by setting a disk drive of one storage system as a copy source and a disk drive of the other storage system as a copy destination in advance.

Figure 2A:
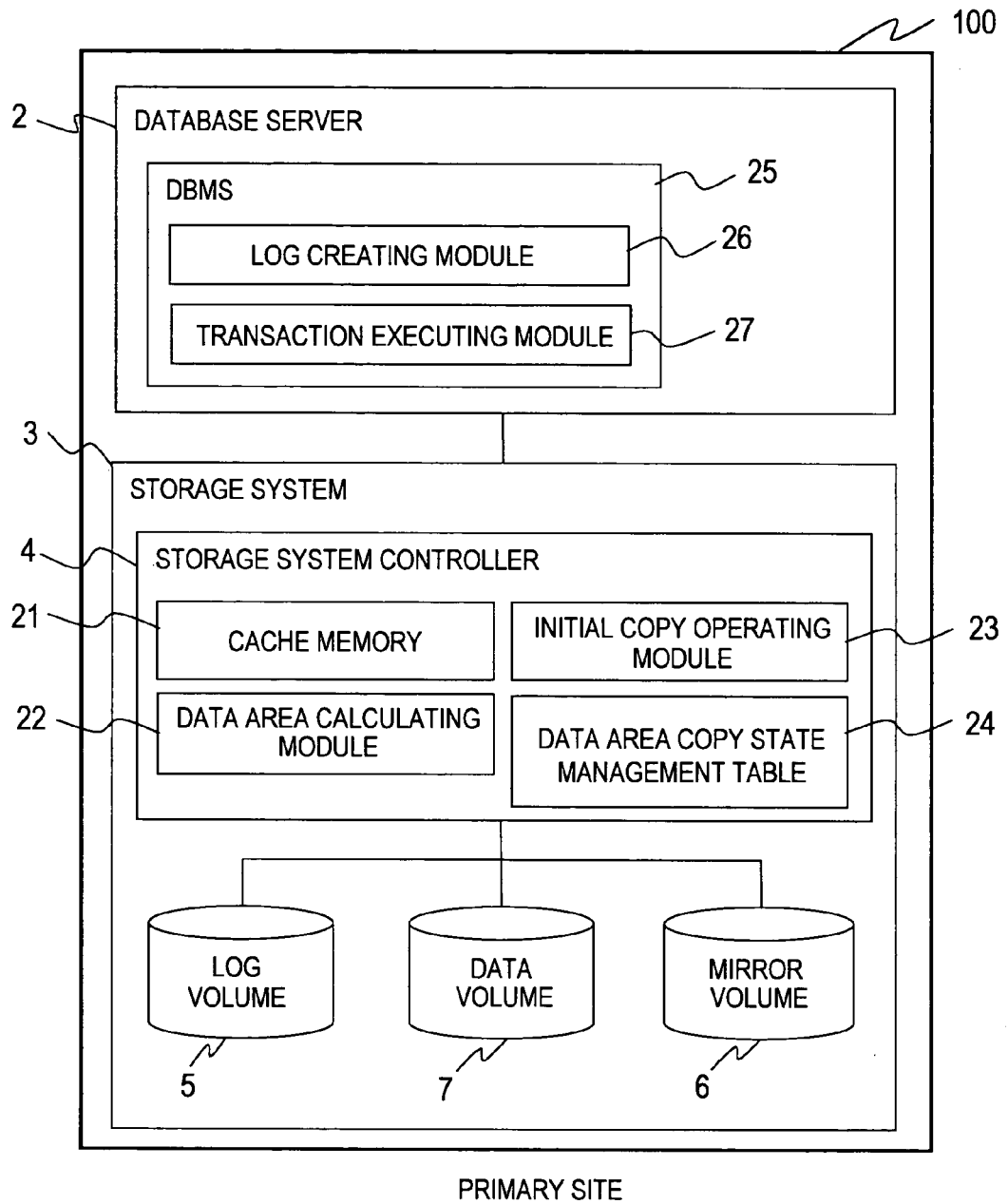
FIG. 2A is a block diagram showing the configuration of a primary site according to the first embodiment.

FIG. 2A is a block diagram of the primary site 100 according to the first embodiment. The primary site 100 contains the DB server 2 and the storage system 3 as mentioned above.

The DB server 2 contains a database management system (DBMS) 25. The DBMS 25 receives a request to process data stored in the database, and retrieves and updates data as requested by the processing request. The DBMS 25 contains a transaction executing module 27 and a log creating module 26.

The transaction executing module 27 retrieves or updates requested data of a data volume 7. A transaction is the unit of processing that groups series of database server processing together, and it is either executing all of the processing or executing none of the processing. A service application system avoids inconsistency in a DB by processing on a transaction basis.

The log creating module 26 creates the history of processing executed by the transaction executing module 27, and stores the history in a log volume 5 of the storage system 3.

The storage system 3 has a storage system controller 4 and the disk drives 105 to 107.

The disk drive 105 contains the log volume 5. The log volume 5 stores a log that shows the history of DB updates.

The disk drive 107 contains the data volume 7. The data volume 7 stores data of online processing, data necessary to online processing, data used within the DB server 2, and others.

The disk drive 106 contains a mirror volume 6. The mirror volume 6 stores a copy of the data volume 7 made quiescent.

The storage system controller 4 receives a processing request from the DBMS 25, and retrieves and updates data stored in the respective disk drives. After the data retrieval or update is completed, the storage system controller 4 notifies the DB server 2 of the completion.

The storage system controller 4 contains a cache memory 21, a data area calculating module 22, an initial copy operating module 23 and a data area copy state management table 24.

The cache memory 21 temporarily stores data for high-speed read/write processing. The data area calculating module 22 identifies which data area contains data to be updated according to a processing request from the DB server 2.

The data area copy state management table 24 is a bitmap corresponding to data areas in the mirror volume 6. In this table, a flag is set to a data area of which data has been copied to a backup data volume 16.

The initial copy operating module 23 checks, when an update request is received from the DB server 2, an area to be updated against the data area copy state management table 24. In the case where the area to be updated has not been copied to the remote site 110, the initial copy operating module 23 copies the data area by priority.

Figure 2B:
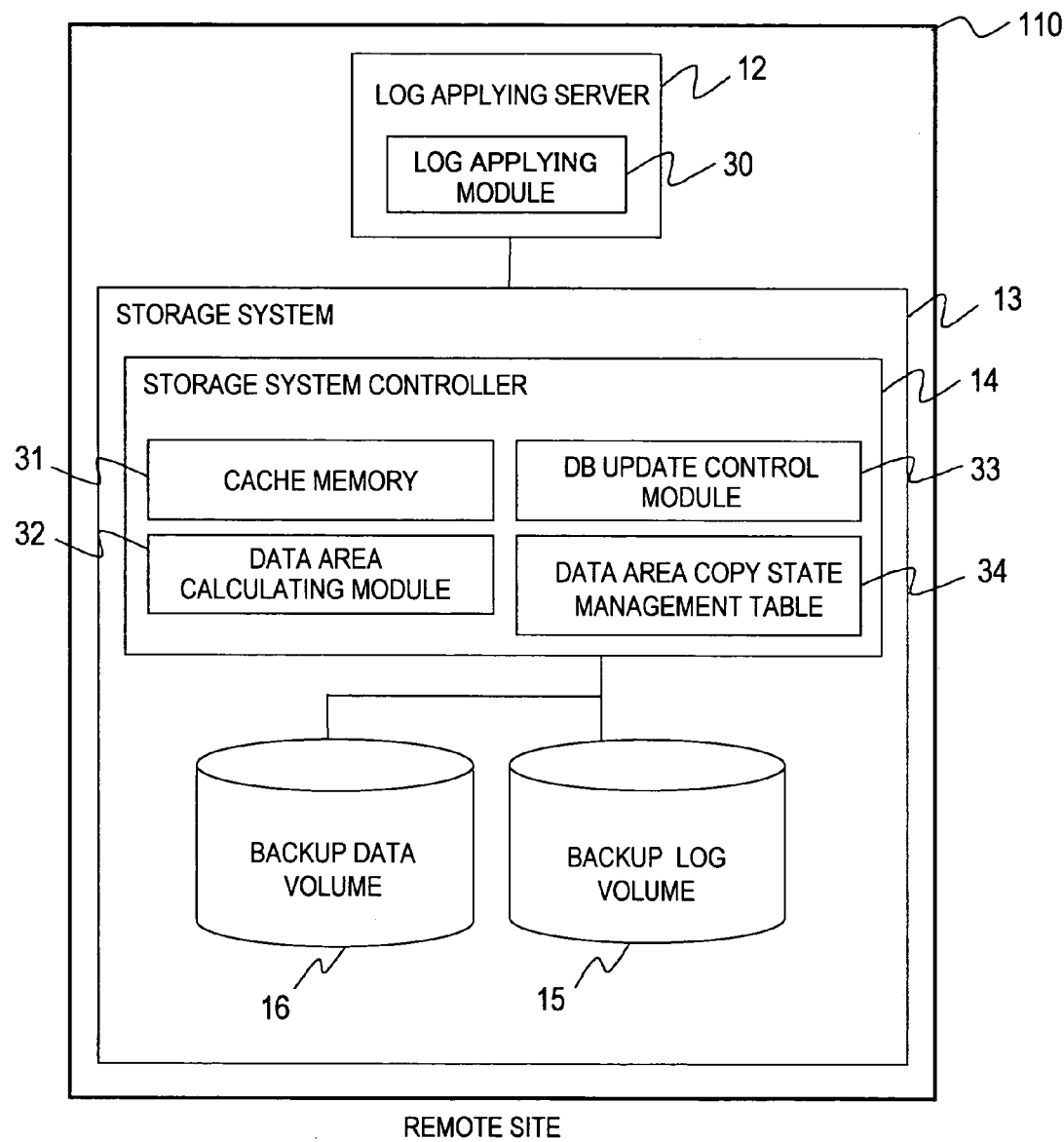
FIG. 2B is a block diagram showing the configuration of a remote site according to the first embodiment.

FIG. 2B is a block diagram of the remote site 110 according to the first embodiment. The remote site 110 contains the simple server 12 and the storage system 13 as mentioned above.

The simple server 12 contains a log applying module 30. The log applying module 30 applies a log copied from the primary site 100, thereby keeping up to date data that is stored in the storage system 13 as a copy of data of the primary site 100.

The storage system 13 has a storage system controller 14 and the disk drives 115 and 116.

The disk drive 115 contains a backup log volume 15 to which the log of processing executed in the primary site 100 is copied.

The disk drive 116 contains the backup data volume 16 in which a copy of service application data stored on the primary site 100 is stored.

The storage system controller 14 retrieves and updates data stored in the respective disk drives. When the backup log volume 15 is updated via the storage system-to-storage system interface 9, the storage system controller 14 notifies the simple server 12 of the update.

The storage system controller 14 contains a cache memory 31, a data area calculating module 32, a DB update control module 33, and a data area copy state management table 34.

The cache memory 31 temporarily stores data for high-speed read/write processing. The data area calculating module 32 identifies which data areas in the log volume 15 and the data volume 16 are relevant to a processing request made by the simple server 12. The data area calculating module 32 identifies which of data areas of the backup log volume 15 and the backup data volume 16 the requested data is retrieved from.

The data area copy state management table 34 is a bitmap corresponding to data areas in the backup data volume 16. In this table, a flag is set to a data area that has completed copying from the mirror volume 6.

The DB update control module 33 checks the data area copy state management table 34 when the log applying module 30 requests to fetch data. In the case where a data area from which the data is to be retrieved has not been copied, the DB update control module 33 stops the processing of the log applying module 30 until the copy is completed.

Figure 3:
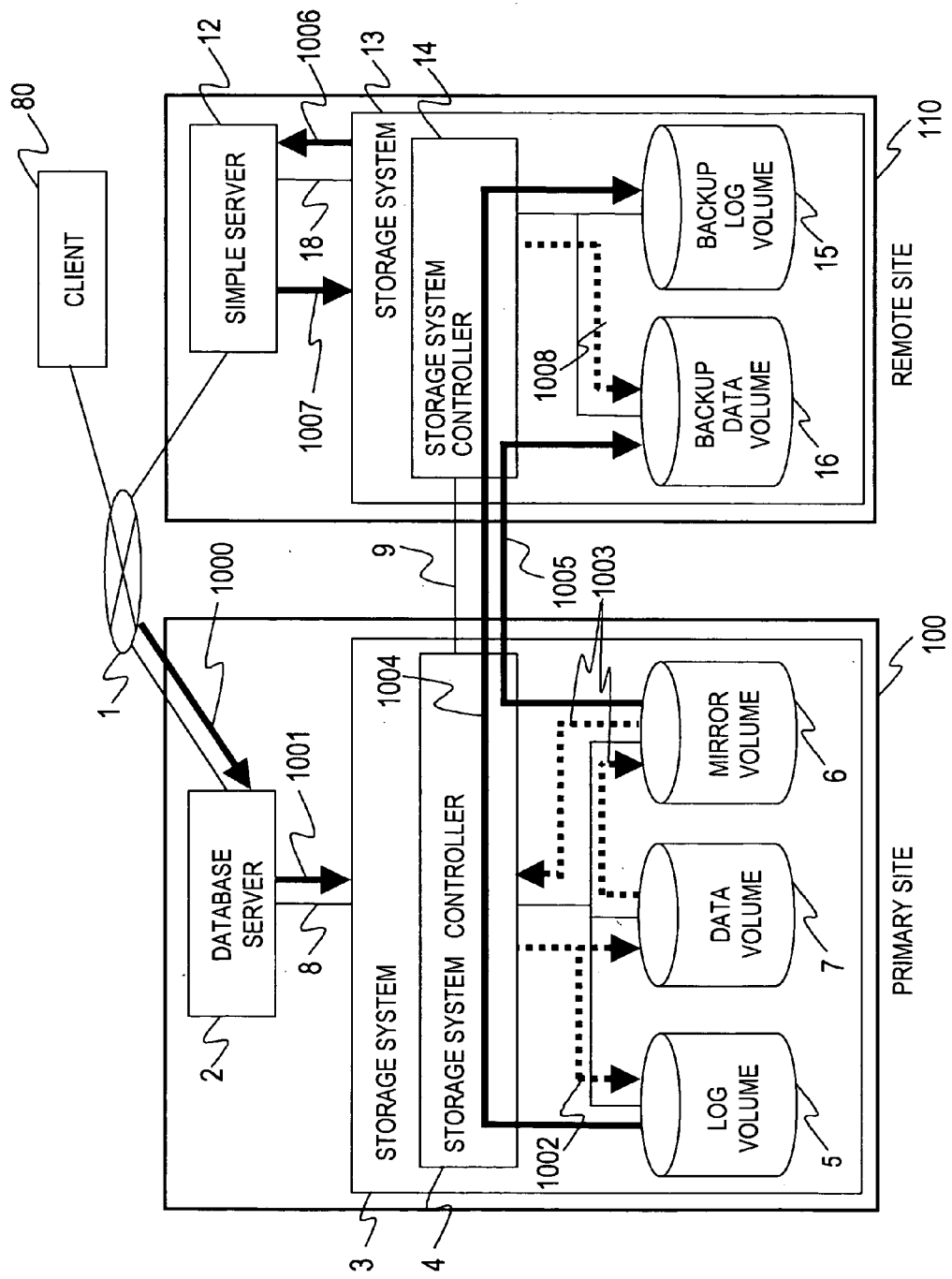
FIG. 3 is a block diagram of the log-based DR system according to the first embodiment.

FIG. 3 is a block diagram of the log-based DR system according to the first embodiment. Now, a procedure of creating, in the remote site 110, a copy of the latest version of data stored in the primary site 100 will be described.

In order to keep data on the remote site 110 up to date, the remote site 110 needs data that is made quiescent at some point and a log past the quiescent point. In the first embodiment, initial copy is executed to copy data from the mirror volume 6 split from the backup data volume 16. Then, after online processing is started on the primary site 100, the log of the primary site 100 and a synchronously copied log are applied as needed to the data created by the initial copy. Data on the remote site 110 can thus be kept up to date.

Before steps of the initial copy are described, a description will be given of the initial settings of the DR system, specifically, the build of an environment in which the DR system is executed including DBMS settings and settings of the storage systems. For instance, the primary site 100 is set such that the data volume 7 and the log volume 5 are accessible from the DB server 2.

Next, the DB server 2 copies, through local mirroring, service application data stored in the data volume 7 to the mirror volume 6. After every piece of the service application data is copied, the DB server 2 disables local mirroring. The mirror volume 6 thus stores a copy of the data volume 7 at the time of the initial setting and is kept splitting even after the storage system 3 starts accepting online processing requests.

The remote site 110 is set such that the backup data volume 16 and the backup log volume 15 are accessible from the simple server 12. The remote site 110 is also set such that the storage system 3 and the storage system 13 are communicable with each other via the storage system-to-storage system interface 9 by, for example, setting the initial settings of a remote copy function with which the storage systems 3 and 13 copy data to and from each other without the intervention of the DB server 2 and the simple server 12.

After the initial setting is completed, initial copy is started. Initial copy includes a sequential copy for copying sequentially from the head address of a data area, and a priority copy for copying a specific data area preferentially.

The primary site 100 allows the DB server 2 to start accepting online processing as initial copy begins. When an update is made to data which has not completed the initial copy, the data to be updated is copied before others.

Initial copy control processing will be described below with reference to FIG. 3. Arrows 1000 to 1008 each represent a processing step. The reference symbols of the arrows do not reflect the order of the processing steps.

(Initial Copy Control Processing First Step 1000)

In Step 1000, the client computer 80 sends an online processing request to the DB server 2 via the network 1. The online processing request is sent according to a protocol employed by the network 1, and specifies what processing the DB server 2 is to execute. For example, a combination of SQL commands is sent as an online processing request according to a TCP/IP protocol.

The DB server 2 receives the transmitted online processing request and executes requested online processing. For example, the DB server 2 analyzes SQL commands contained in the online processing request, and executes requested processing such as data update.

(Initial Copy Control Processing Second Step 1001)

In Step 1001, data stored in the storage system 3 is fetched or updated according to the online processing request received in Step 1000.

The DB server 2 instructs, via the server-to-storage interface 8, the storage system controller 4 to retrieve or update data. For instance, a host bus adapter is mounted to the DB server 2 to send SCSI commands to the disk controller via a Fibre Channel. In the case where the requested processing involves data update, the DB server 2 instructs the storage system controller 4 to update the log, too.

Log/data update may be executed each time an update request is received, or on a transaction-basis, or in an input/output unit specified by the DB server 2, for example, the buffer capacity of the DB server 2 or the passage of given time. FIG. 3 illustrating the first embodiment shows, for simplification, that the DB server 2 makes a write request to the storage system 3 in a single transmission, but usually requests directed to different disk drives are sent in separated.

(Initial Copy Control Processing Third Step 1002)

In Step 1002, data is written in a data area to be updated. Upon reception of the data update request, the storage system controller 4 has the data area calculating module 22 identify which data areas are to be updated, and updates the data volume 7 and the log volume 5.

(Initial Copy Control Processing Fourth Step 1003)

In Step 1003, the progress of copying a data area relevant to the update of the data volume 7 is checked. When an update is made to data of the data volume 7, the storage system controller 4 refers to the data area copy state management table 24 to judge whether or not a data area in the mirror volume 6 storing data that corresponds to the updated data of the data volume 7 has been copied to the remote site 110. In the case where the data area has been copied, the storage system controller 4 continues the processing.

In the case where the data area has not been copied to the remote site 110, the initial copy operating module 23 copies the corresponding data area of the mirror volume 6 before others regardless of the progress of the sequential copy. To be specific, first, the initial copy operating module 23 sends update data to the remote site 110 via the storage system-to-storage system interface 9. The storage system controller 14 writes the received update data in the backup data volume 16, and notifies the DB server 2 of the completion of the write. Notified of the completion of writing the update data, the DB server 2 rewrites the data area copy state management table 24 to make the table show that copying of the data area has been completed. For instance, in the data area copy state management table 24, "1" is set for a record entry corresponding to the area from which data has already been copied whereas "0" is set for a record entry corresponding to the area from which data has not been copied yet.

(Initial Copy Control Processing Fifth Step 1004)

In Step 1004, the update made to the log volume 5 is reflected on the backup log volume 15.

The storage system controller 4 sends the update made to the log volume 5 to the storage system controller 14 via the storage system-to-storage system interface 9, and instructs the storage system controller 14 to update the backup log volume 15. The storage system controller 14 writes the received update of the log volume 5 in the backup log volume 15. After the writing is completed, the storage system controller 4 notifies the DB server 2 of the completion of the log write.

The first embodiment employs synchronous copy in which an update made to the log volume 5 is reflected on the backup log volume 15. Alternatively, asynchronous copy may be employed in which updates are copied at regular intervals.

(Initial Copy Control Processing Sixth Step 1005)

Step 1005 is sequential copy processing which has been executed continuously since the completion of the initial setting.

The storage system controller 4 sends, to the storage system controller 14, via the storage system-to-storage system interface 9, data in data areas of the mirror volume 6 that has not been copied in an ascending order of data area address.

The storage system controller 14 receives the transmitted data and updates corresponding data areas of the backup data volume 16. After the update is completed, the storage system controller 4 rewrites the data area copy state management table 24 to make the table show that these data areas have been copied.

The progress of the initial copy is also registered in the data area copy state management table 34, which is stored in the storage system 13 of the remote site 110. As in the data area copy state management table 24, in the data area copy state management table 34, "1" is set to a record entry corresponding to an area from which data has already been copied whereas "0" is set to a record entry corresponding to an area from which data has not been copied yet.

(Initial Copy Control Processing Seventh Step 1006)

In Step 1006, the simple server 12 is notified of the completion of the update of the backup log volume 15. The simple server 12 is notified of the completion by, for example, sending a special command that requests an update notification and receiving a response to the command from the storage system controller 14. Alternatively, the simple server 12 may have a cut-in interface for notifying an update of the backup log volume 15 from the storage system controller 14.

The storage system controller 14 does not need to notify the simple server 12 each time the backup log volume 15 is updated, and may instead notify at regular intervals.

(Initial Copy Control Processing Eighth Step 1007, 1008)

In Step 1007 and Step 1008, the simple server 12 receives an update notification of the backup log volume 15 and the log applying module 30 applies the updated log to the backup data volume 16.

The simple server 12 first has the log applying module 30 retrieve the updated log of the backup log volume 15.

Next, the log applying module 30 obtains from the backup data volume 16 a data area to which the retrieved log is applied. The log applying module 30 sends a data area obtaining request to the storage system controller 14 via the server-to-storage interface 18.

Upon reception of the data area obtaining request, the storage system controller 14 has the data area calculating module 32 identify the data area to be obtained.

The DB update control module 33 refers to the data area copy state management table 34 to judge whether the data area to be obtained has been copied or not. In the case where the data area has been copied, data in the requested data area is retrieved and sent to the log applying module 30.

In the case where the data area to be obtained has not been copied yet, the DB update control module 33 stands by until copying of the data area is completed. Even in the case where the copying of the data area to be obtained is not completed, the copying of the data area to be obtained is finished quickly since the processing of Step 1003 (priority copy) is executed.

Obtaining the data area to be updated, the log applying module 30 applies the log to the data area and sends to the storage system controller 14 a request to write the updated data (Step 1007).

The storage system controller 14 updates the backup data volume 16 following the received write request (Step 1008).

As described above, online processing and log application can be executed in parallel by preferentially copying data to which a log is to be applied to the remote site 110 each time online processing updates data of the primary site 100.

In addition, the DR system of the first embodiment makes sure that the whole data stored in the mirror volume 6, including data areas that are not the subjects of priority copy, is copied to the backup data volume 16 through sequential copy.

The configuration described above has one remote site 110 for one primary site 100. Alternatively, the DR system of the first embodiment may have a configuration in which data is copied from the primary site 100 to a plurality of remote sites 110.

Described next are steps of processing executed by the DB server 2 and the storage system 3 on the primary site 100 and by the simple server 12 and the storage system 13 on the remote site 110 according to the first embodiment.

Figure 4:
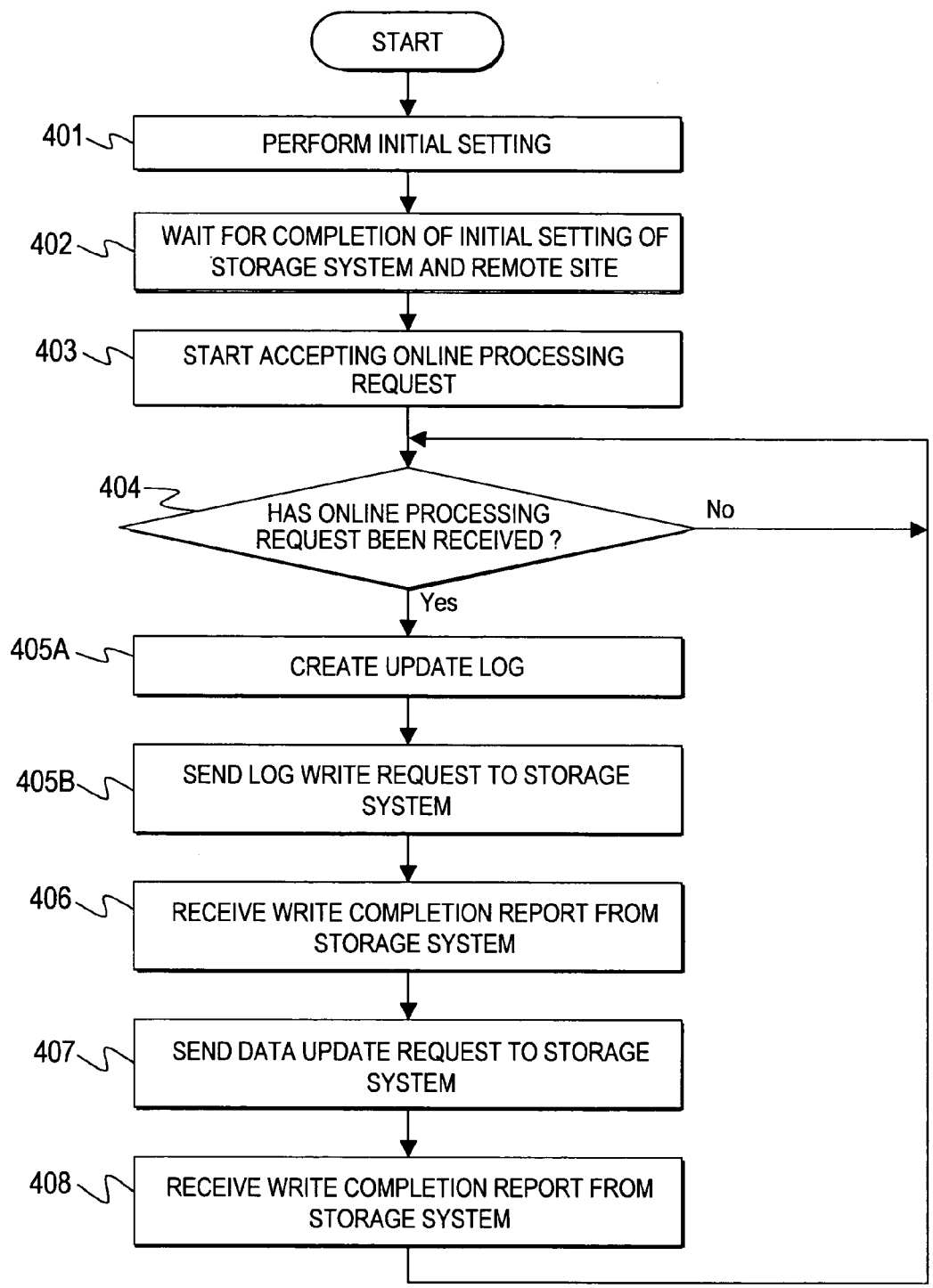
FIG. 4 is a flow chart showing online processing of a database server on the primary site according to the first embodiment.

FIG. 4 is a flow chart showing processing steps of the DB server 2 on the primary site 100 according to the first embodiment. The processing steps shown in FIG. 4 are of initial setting and of online processing for update.

The DB server 2 executes initial setting such as data base construction and disk drive allocation (401). The DB server 2 stands by until the storage system 3 and the remote site 110 respectively finish initial setting (402). To be specific, the DB server 2 waits for the completion of such processing as setting the connection between the storage systems of the primary site 100 and the remote site 110, and building the environment of the simple server 12 on the remote site 110.

After the initial setting of the primary site 100 and the remote site 110 is finished, the DB server 2 starts accepting online processing requests from the client computer 80 (403). Online processing is, for example, merchandise management in mercantile trade processed via the Internet.

The DB server 2 receives an online processing request and executes online processing ("Yes" to Step 404). When the received online processing request involves data update, the log creating module 26 creates a log (405A). Then the transaction executing module 27 sends a log write request to the storage system 3 (405B), and receives a write completion report after the storage system 3 finishes writing the log (406).

The transaction executing module 27 next sends a data update request to the storage system 3 (407) and, after the data update is completed, receives an update completion report (408).

Upon reception of the update completion report, the DB server 2 stands by until the next online processing request is received.

Figure 5:
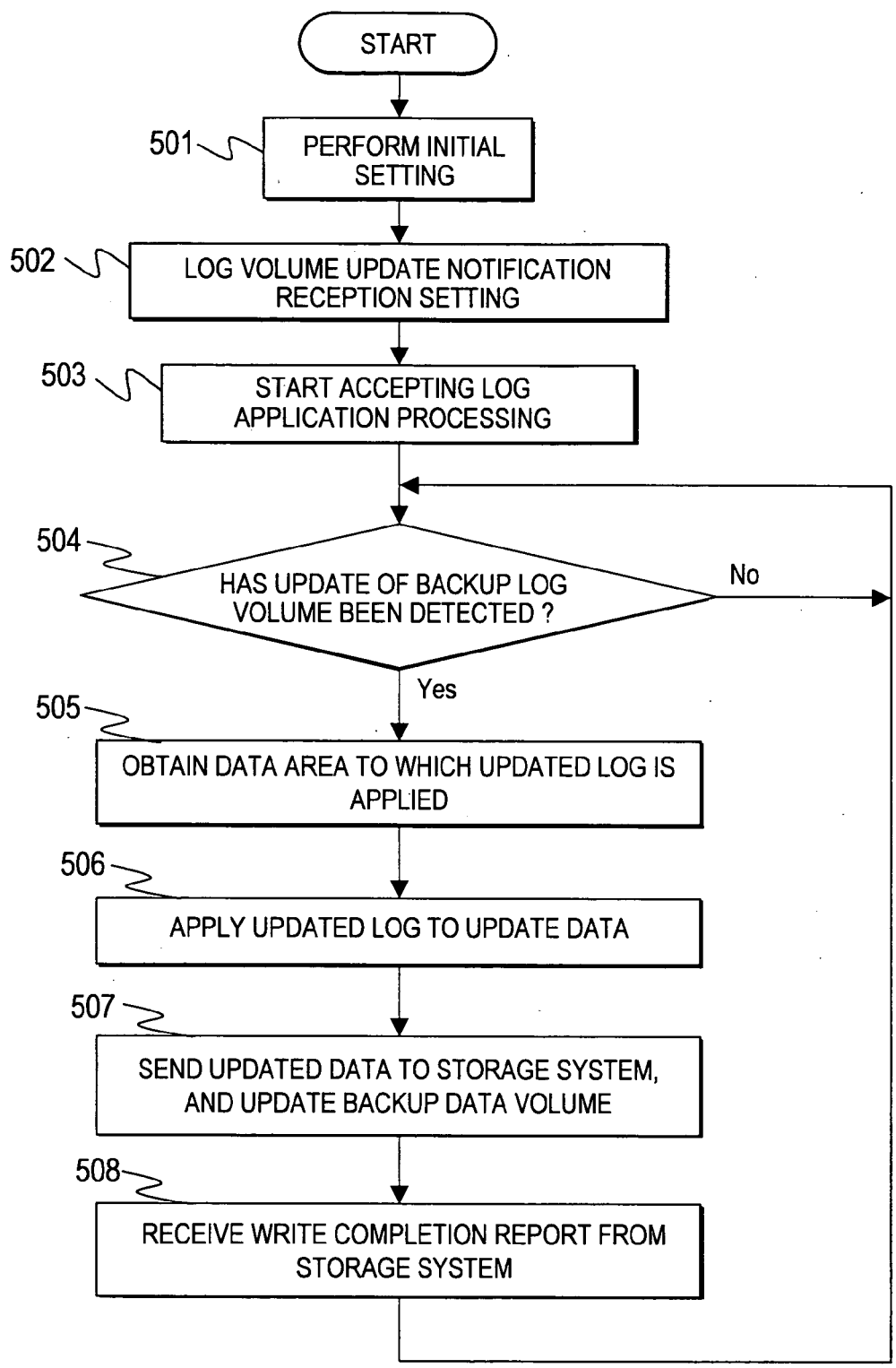
FIG. 5 is a flow chart showing log application processing of a simple server on the remote site according to the first embodiment.

FIG. 5 is a flow chart showing processing steps of log application processing, which is executed by the simple server 12 of the remote site 110 according to the first embodiment.

The initial setting of the remote site 110 is executed according to the settings of the primary site 100 since the remote site 110 stores through log application a copy of data that is stored on the primary site 100 (501). Set in the initial setting are, for example, disk drives to which data is copied from the primary site 100.

Settings for detecting an update of the backup log volume 15 are set next (502). When the log volume 5 of the primary site 100 is updated, the update received via the storage system-to-storage system interface 9 by the storage system 13 is recorded in the backup log volume 15. The simple server 12 detects an update of the backup log volume 15 at this point. Examples of how to detect an update include a method in which the storage system 13 notifies the simple server 12 of an update made to the backup log volume 15, and a method in which the simple server 12 regularly checks for updates of the backup log volume 15.

Once the above setting is completed, the simple server 12 starts receiving log application processing (503). The simple server 12 detects an update of the backup log volume 15 ("Yes" to 504), and has the log applying module 30 execute log application processing.

The log applying module 30 retrieves the updated log from the backup log volume 15 and obtains from the backup data volume 16 data to be updated (505). The log applying module 30 applies the updated log to the obtained data, thereby updating the data (506). The updated data is sent to the storage system 13 and written in the backup data volume 16 by the log applying module 30 (507). After the data update is completed, the simple server 12 receives an update completion report from the storage system 13 (508). The simple server 12 then stands by until another update of the backup log volume 15 is detected.

Data in the backup data volume 16 can thus be matched with data in the data volume 7 of the primary site 100.

Figure 6:
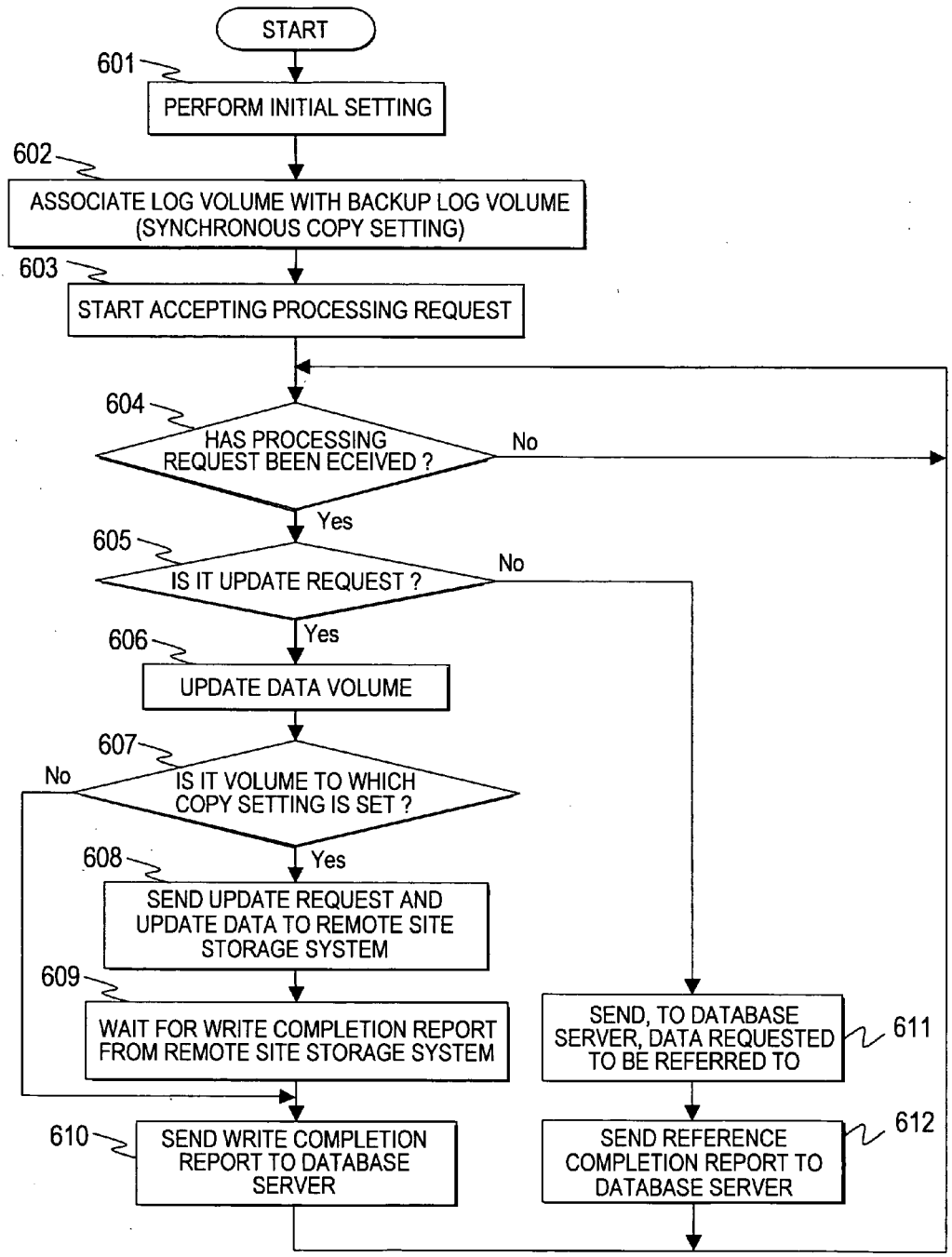
FIG. 6 is a flow chart showing reference and update processing of a primary site storage system according to the first embodiment.

FIG. 6 is a flow chart showing online processing steps of the storage system 3 on the primary site 100 according to the first embodiment.

In the storage system 3, initial setting such as allocating the disk drives 105 to 107 to the DB server 2 is executed first (601). Then the log volume 5 of the primary site 100 is associated with the backup log volume 15 of the remote site 110, and synchronous copy setting is executed (602). The log volumes are associated only after the simple server 12 and the storage system 13 on the remote site 110 finish initial setting.

As the above setting is completed, the storage system 3 starts receiving reference and update processing (603), and waits for data update requests and other online processing requests made by the DB server 2 (604). The storage system controller 4 of the storage system 3 receives a processing request ("Yes" to 604), and judges whether the processing request is an update request or not (605).

In the case where the received processing request is not an update request ("No" to 605), the storage system controller 4 sends information that is requested for reference to the DB server 2 (611), and sends a reference completion report to the DB server 2 (612). Note that the description here treats disk drive control request and other similar requests as reference requests.

In the case where the received processing request is an update request ("Yes" to 605), the storage system controller 4 records update data in a designated volume of the storage system 3 (606).

The storage system controller 4 then judges whether or not the updated volume is a volume set such that its data is copied to the remote site 110 through synchronous copy (607). In the case where the updated volume is not the subject of synchronous copy ("No" to 607), the storage system controller 4 sends a write completion report to the DB server 2 (610).

In the case where synchronous copy is to be performed on the updated volume ("Yes" to 607), the storage system controller 4 sends to the storage system 13 of the remote site 110 an update request and the update made (608). The storage system controller 4 waits for an update completion report from the storage system 13 (609) and, receiving the update completion report, sends a write completion report to the DB server 2 (610).

Figure 7:
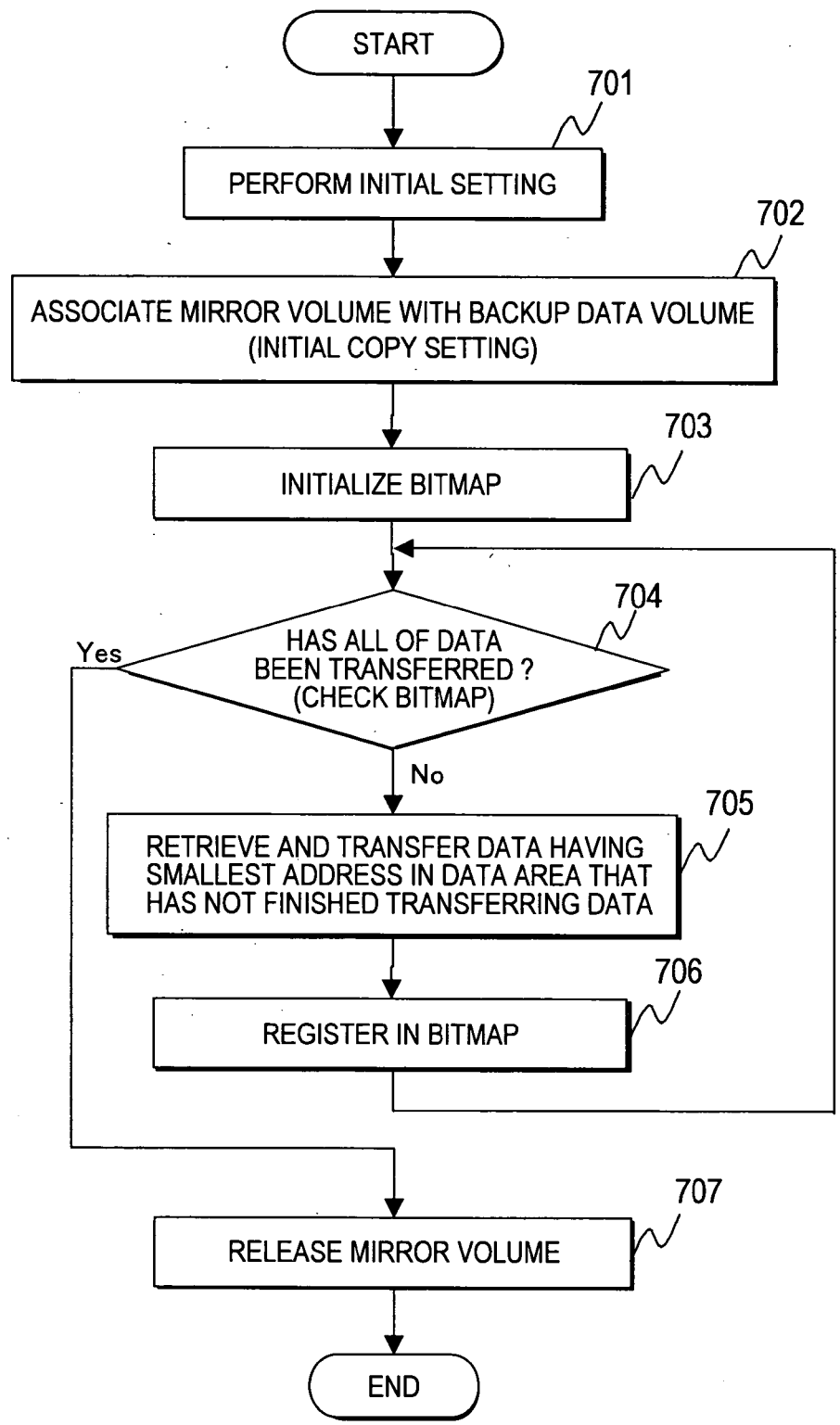
FIG. 7 is a flow chart showing a sequential copy procedure of the primary site storage system according to the first embodiment.

FIG. 7 is a flow chart showing processing steps of sequential copy, which is executed in the storage system 3 of the primary site 100 according to the first embodiment.

In the storage system 3, initial setting such as creating the mirror volume 6 by duplicating the data volume 7 through local mirroring is executed first (701). As the mirror volume 6 is completed, the data volume 7 and the mirror volume 6 are split to make the mirror volume 6 suspended. Then initial copy setting is executed which includes associating the mirror volume 6 of the primary site 100 with the backup data volume 16 of the remote site 110 (702).

The storage system controller 4 then initializes the data area copy state management table 24 (703). The data area copy state management table 24 is a bitmap for data areas of the mirror volume 6 as mentioned above. Initializing the table means to set, for example, "0" to every record entry that represents a data area stored in the bitmap.

After the above setting is completed, the storage system controller 4 starts sequential copy from the mirror volume 6 to the backup data volume 16. The storage system controller 4 refers to the data area copy state management table 24 to monitor the copy state when the sequential copy is started.

The storage system controller 4 ends the initial copy of data when every data area in the mirror volume 6 finishes being copied ("Yes" to 704). To be specific, the initial copy of data is ended when "1" is set to every record entry of the data area copy state management table 24 each representing a data area in the bitmap.

In the case where there are data areas that have not finished initial copy ("No" to 704), the storage system controller 4 refers to the data area copy state management table 24 and copies data stored in a data area whose address is the smallest among the data areas that have not finished initial copy (705). The storage system controller 4 updates only parts corresponding to data areas that are confirmed by the data area copy state management table 24 to have finished initial copy (706). Then the storage system controller 4 judges whether or not every data area in the mirror volume 6 has been copied and, when there are still data areas left that have not been copied, continues the processing until every data area finishes initial copy. When it is judged that every data area has been copied ("Yes" to 704), the storage system controller 4 releases the mirror volume 6 from the DR system (707) and ends the initial copy.

Although the mirror volume 6 is released from the DR system through the processing of Step 707, the log-based DR system of the first embodiment does not need the mirror volume 6 after the initial copy is completed. This is because, once the initial copy is completed, data stored in the remote site 110 can be kept up to date by applying a log that is transferred from the primary site 100 to the backup data volume 16.

Figure 8:
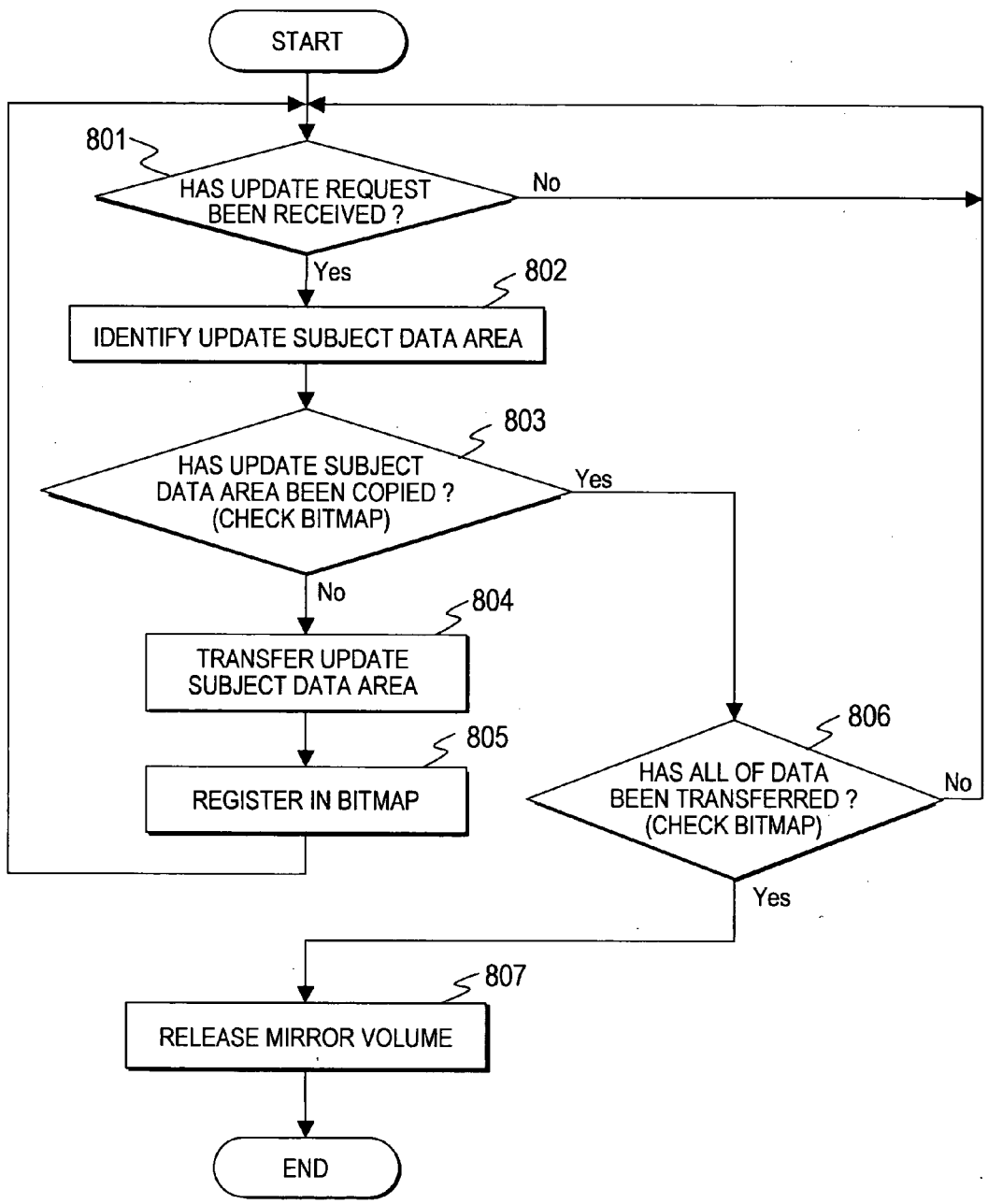
FIG. 8 is a flow chart showing a priority copy procedure of the primary site storage system according to the first embodiment.

FIG. 8 is a flow chart showing processing steps of priority copy, which is executed in the storage system 3 of the primary site 100 according to the first embodiment.

The storage system controller 4 first receives from the DB server 2 an update request as a processing request ("Yes" to 801), and identifies which data area is to be updated (802). The storage system controller 4 next judges whether or not the identified data area has finished initial copy by referring to the data area copy state management table 24 (803).

In the case where the initial copy of the identified data area has not been completed ("No" to 803), the storage system controller 4 copies the identified data area before others to the backup data volume 16 (804). After the identified data area is copied, the storage system controller 4 updates the data area copy state management table 24 (805).

In the case where the identified data area has already been copied to the backup data volume 16 ("Yes" to 803), the storage system controller 4 checks whether or not every data area has been copied (806). In the case where every data area has been copied ("Yes" to 806), the storage system controller 4 releases the DR system from the mirror volume 6 (807) and finishes the initial copy. In the case where not all of the data areas have been copied ("No" to 806), the storage system controller 4 continues the processing until every data area has been copied.

Thus duplicating the data volume 7 for storing service application data enables the storage system 3 to execute initial copy without affecting online processing. In initial copy, sequential copy for copying sequentially from the head data area and priority copy for preferentially copying a data area to which an update request is made are executed in parallel.

Figure 9:
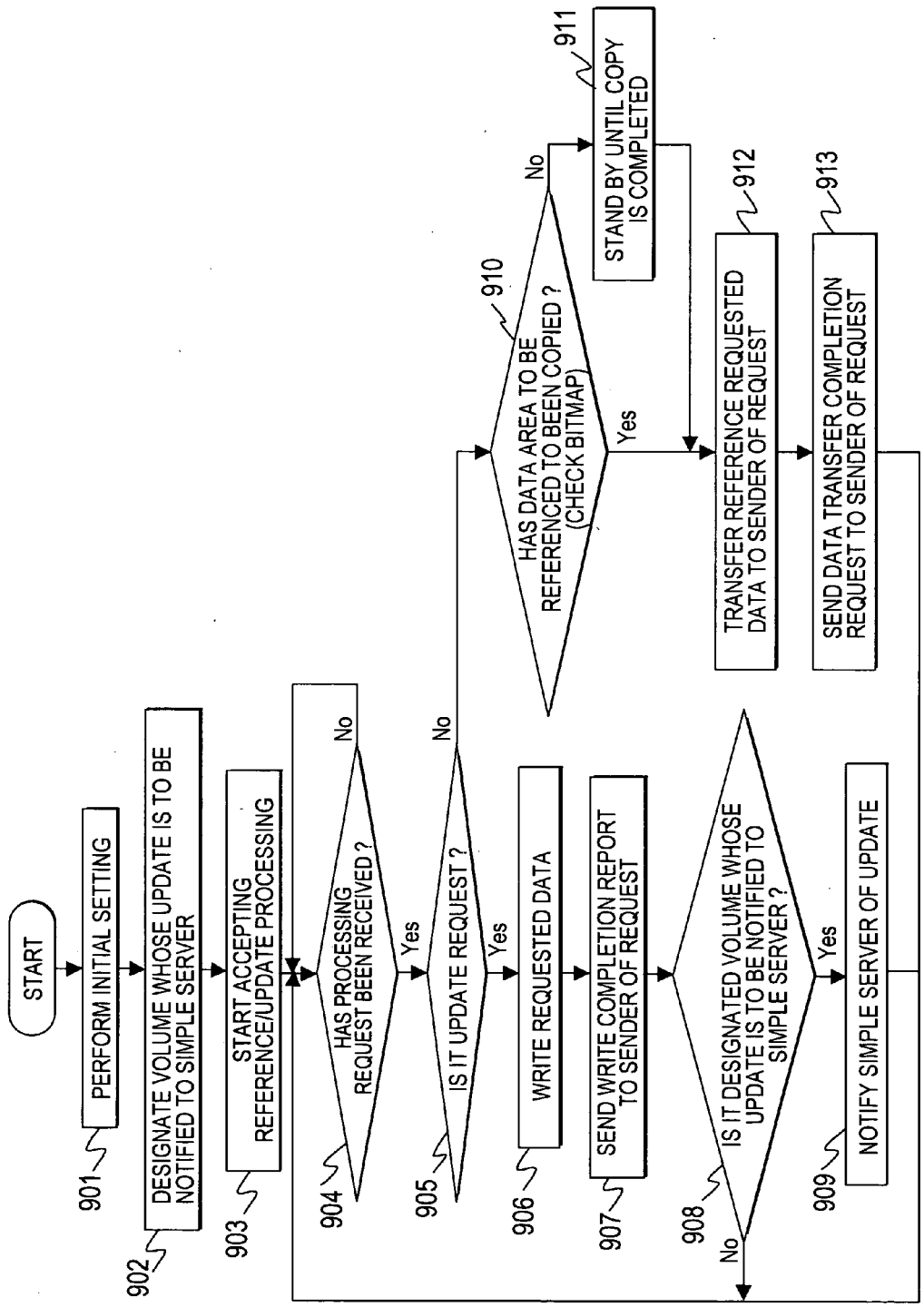
FIG. 9 is a flow chart showing reference and update processing of a remote site storage system according to the first embodiment.

FIG. 9 is a flow chart showing steps of processing that is executed in the storage system 13 of the remote site 110 according to the first embodiment.

In the storage system 13, initial setting is executed first including setting of remote copy from the storage system 3 (901). The storage system 13 next specifies which volume is to be notified to the simple server 12 when its data is updated (902). To be specific, the backup log volume 15 is designated as the volume to be notified since it is necessary to notify the simple server 12 of an update of the backup log volume 15 in order to apply the updated log to the backup data volume 16.

As the above setting is completed, the storage system 13 starts receiving reference and update processing (903), and is now ready to receive processing requests from the storage system 3 or the simple server 12. The storage system controller 14 receives a processing request ("Yes" to 904), and judges whether the received processing request is an update request or not (905).

In the case where the received processing request is an update request ("Yes" to 905), the storage system controller 14 writes requested data in one of the disk drives (906). After the data write is completed, the storage system controller 14 sends a write completion report to the sender of the update request (907). The storage system controller 14 then judges whether or not the simple server 12 needs to be notified of the update (908) and, when it is necessary, notifies the simple server 12 of the update (909).

In the case where the received processing request is not an update request, the storage system controller 14 finds out from the data area copy state management table 24 the copy state of a data area that is requested for reference, to thereby judge whether or not the data area has finished initial copy (910). In the case where the initial copy of the data area has not been completed ("No" to 910), the storage system controller 14 stands by until the initial copy is finished (911). In the case where the initial copy of the data area has already been completed ("Yes" to 910), the storage system controller 14 sends data requested for reference to the sender of the processing request (912), and then sends an information transfer completion report (913).

The storage system 13 of the remote site 110 thus executes necessary processing in response to update requests from the primary site 100 and reference and update requests from the simple server 12 of the remote site 110. When it is an update request that the storage system 13 receives, log application processing can be executed in parallel with online processing by checking the copy state of a data area of a disk drive to be updated and waiting for the completion of copying of the data area in the case where the data area has not been copied.

As mentioned above, the first embodiment makes it possible to start online processing before initial copy is completed by creating the mirror volume 6 as a duplicate of the data volume 7.

According to the first embodiment, when an update is made to data that has not finished initial copy, the data to be updated is preferentially copied to the backup data volume 16. Log application is put off until the copying of the data is completed, and the data is thus kept up to date. This makes it possible to avoid log wrap round even when initial copy takes considerable time, and facilitate the setup of a DR system.

Second Embodiment

In the first embodiment, online processing and initial copy processing are executed in parallel by duplicating the data volume 7 of the primary site 100. In a second embodiment, online processing and initial copy processing are executed in parallel by copying the data volume 7 asynchronously, instead of duplicating the DB.

Figure 10:
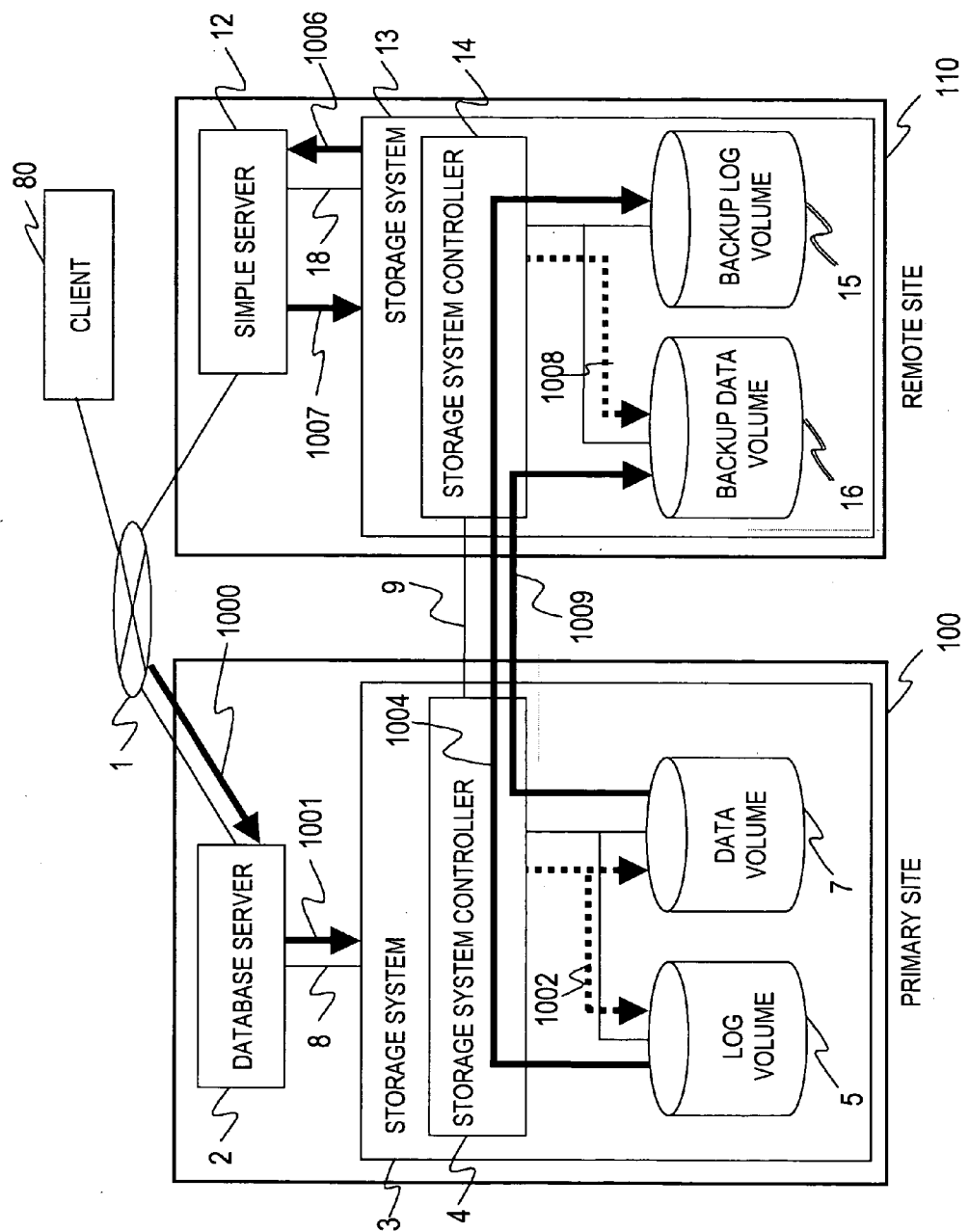
FIG. 10 is a block diagram of a log-based DR system according to a second embodiment.

FIG. 10 is a block diagram of a log-based DR system according to the second embodiment. In the second embodiment, components that function the same way as in the first embodiment will be denoted by the same reference symbols used in the first embodiment, and the descriptions on those components may not be repeated.

The DR system of the second embodiment does not have a volume that corresponds to the mirror volume 6 of the first embodiment. Therefore, when the data volume 7 is updated and priority copy is executed in the second embodiment, the updated data is copied to the backup data volume 16 (1009).

In the second embodiment, a write completion notification is sent to the DB server 2 after the data volume 7 and the log volume 5 are updated, without waiting for the update data to finish being copied to the remote site 110. Copying update data to the remote site 110 asynchronously in this manner makes it possible to execute initial copy in parallel with online processing. However, in the case where a failure occurs in the storage system-to-storage system interface 9 immediately after data is updated on the primary site 100, the data update may not be reflected on the remote site 110.

As described, the second embodiment makes it possible to start online processing on the primary site 100 before initial copy is completed as in the first embodiment, but without duplicating the DB. The second embodiment also facilitates the setup of the DR system while avoiding log wrap round as well as the first embodiment.

While the present invention has been described in detail and pictorially in the accompanying drawings, the present invention is not limited to such detail but covers various obvious modifications and equivalent arrangements, which fall within the purview of the appended claims.

For instance, the initial copy operating module and the data area copy state management table which are provided in the storage system 3 of the primary site 100 in the first and second embodiments, may be placed in the DB server 2 instead. In this case, the DB server 2 refers to the data area copy state management table to check the progress of the initial copy and to issue, to the storage system 3, a command for transferring a data area to which a log is to be applied.

This invention is applicable to information processing systems in which data is copied between sites in anticipation for a failure from a disaster or the like.

What is claimed is:

1. A backup system, comprising:
 a first site; and
 a second site coupled to the first site via a network, for storing a copy of data stored in the first site,
 the first site, comprising:
  a first computer having a database management system, for executing a reference processing and an update processing according to a request sent from a client computer; and
  a first storage system for storing data accessed by the first computer,
 the second site comprising:
  a second computer; and
  a second storage system for storing the copy of data stored in the first site, the first computer comprising:
- a first communication interface for coupling to the network;
- a first input/output interface for coupling to the first storage system;
- a first processor coupled to the first input/output interface; and
- a first memory coupled to the first processor, the first storage system comprising:
- a second input/output interface for coupling to the first computer and to the second storage system;
- a second processor coupled to the second input/output interface;
- a second memory coupled to the second processor; and
- a first disk drive for storing data accessed by the first computer, the second computer comprising:
- a second communication interface for coupling to the network;
- a third input/output interface for coupling to the second storage system;
- a third processor coupled to the third input/output interface; and
- a third memory coupled to the third processor, the second storage system comprising:
- a fourth input/output interface for coupling to the first storage system and to the second computer;
- a fourth processor coupled to the fourth input/output interface;
- a fourth memory coupled to the fourth processor; and
- a second disk drive for storing the copy of the data stored in the first storage system, the first disk drive comprising:
- a first volume for storing data accessed by the first computer;
- a second volume which is a duplicate of the first volume and which is split from the first volume; and
- a third volume for storing a log of the reference processing and a log of the update processing, the second disk drive comprising:
- a fourth volume which is a duplicate of the first volume; and
- a fifth volume which is a duplicate of the third volume, wherein the first storage system stores a first data area copy state management information including a copy state of data stored in the second volume, wherein the second computer comprises a log applying module which applies a log stored in the fifth volume to the fourth volume to restore data, wherein the second storage system stores a second data area copy state management information including a copy state of data stored in the fourth volume, wherein the data stored in the second volume is sequentially copied to the fourth volume, wherein, upon receiving an update request sent from the client computer, the first computer creates a log and sends the created log and the updated data to the first storage system, wherein the first storage system refers to the first data area copy state management information to judge whether or not data stored in the second volume that corresponds to data that has not been undated and is stored in the first volume has been copied to the fourth volume, wherein, when the data stored in the second volume has not been copied, the first storage system preferentially copies the data stored in the second volume to the fourth volume, wherein the first storage system stores the created log in the third volume and sends the created log to the second storage system, wherein the second storage system stores the received log in the fifth volume and notifies the second computer that the received log has been stored, wherein the second computer instructs the second storage system to obtain data to which the log is to cause the log applying module to apply the received log to data stored in the fourth volume, wherein the second storage system refers to the second data area copy state management information to judge whether the data to which the log is to apply has been copied or not, wherein, when the data to which the log is to apply has not been copied, the second storage system stands by until copying of the data is completed, wherein the second storage system sends, to the second computer, the data to which the log is to apply, and wherein the second computer applies, by the log applying module, the created log to the received data to which the created log is to apply, and stores the updated data in the fourth volume.

2. The system according to claim 1, wherein the first storage system releases the second volume when copying of data that is stored in the second volume to the fourth volume has been completed.

3. The system according to claim 1, wherein the first storage system sequentially copies the created log to the fifth volume.

4. The system according to claim 1, wherein, when the second computer is notified, while the data of the second volume is being copied to the fourth volume, by the second storage system of the storing of the created log in the fifth volume, the log applying module applies the created log to the data to which the created log is to apply and stores the updated data in the fourth volume.

5. A log applying method, which is used for a backup system comprising a first site and a second site coupled to the first site via a network and storing a copy of data of the first site, and in which a log of updates made to data stored on the first site is transferred to the second site and applied to initial data copied, the first site comprising a first computer having a database management system, for executing a reference processing and an update processing according to a request sent from a client computer, and a first storage system for storing data processed by the first computer, the second site comprising a second computer, and a second storage system for storing a copy of data stored in the first storage system, the first storage system including a data volume for storing data processed by the first computer, and a third volume for storing a log of the reference processing and the update processing, the second storage system including a fourth volume which is a duplicate of the data volume, and a fifth volume which is a duplicate of the third volume, the method comprising the steps of:

making a duplicate of the data volume on the fourth volume;

storing, on the first site, a first data copy state of an area that has completed copying of data from the data volume to the fourth volume;

storing, on the second site, a second data copy state of an area that has completed copying of data from the data volume to the fourth volume;

referring to the first data copy state upon reception of an update request at the first computer and judging whether a data area in the data volume that is to update has not been copied to the fourth volume;

preferentially copying the data area to update to the fourth volume when judging that the data area to update has not been copied;

copying a log that is stored in the third volume to the fifth volume;

notifying the second computer of the update of the fifth volume;

referring to the second data copy state and judging whether the data area to update has not been copied to the fourth volume;

standing by until the data area to update completes being copied when the data area to update has not been copied; and applying, to the fourth volume, the log copied to the fifth volume, wherein the data volume comprises a first volume to which updates are reflected, and a second volume which is a duplicate of the first volume, wherein the method further comprises the steps of:

making a duplicate of the first volume on the second volume;

splitting the second volume from the first volume; and copying the second volume to the fourth volume.

6. The log application method according to claim 5, wherein the step of making a duplicate of the data volume of the fourth volume and the step of applying the log to the fourth volume are executed in parallel with each other.

7. The log application method according to claim 5, wherein when the data area to update has not been copied, the data area is copied to the fourth volume after updating the data area.

* * * * *